US012047891B2

(12) United States Patent
Li et al.

(10) Patent No.: US 12,047,891 B2
(45) Date of Patent: Jul. 23, 2024

(54) DATA TRANSMISSION METHOD AND APPARATUS

(71) Applicant: HUAWEI TECHNOLOGIES CO., LTD., Guangdong (CN)

(72) Inventors: Mingchao Li, Beijing (CN); Zhenzhen Cao, Beijing (CN); Xiao Xiao, Beijing (CN); Guanglin Han, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 3 days.

(21) Appl. No.: 16/271,954

(22) Filed: Feb. 11, 2019

(65) Prior Publication Data
US 2019/0174444 A1 Jun. 6, 2019

Related U.S. Application Data

(63) Continuation of application No. PCT/CN2016/094607, filed on Aug. 11, 2016.

(51) Int. Cl.
H04W 56/00 (2009.01)
H04W 4/40 (2018.01)

(52) U.S. Cl.
CPC ....... H04W 56/0015 (2013.01); H04W 56/00 (2013.01); H04W 4/40 (2018.02)

(58) Field of Classification Search
CPC .... H04W 4/40; H04W 56/00; H04W 56/0015
See application file for complete search history.

(56) References Cited

U.S. PATENT DOCUMENTS 10,652,846 B2 * 5/2020 Khoryaev ............ H04B 7/2684
10,721,697 B2 * 7/2020 Li ..................... H04W 56/0015
(Continued)

FOREIGN PATENT DOCUMENTS

CN 103563287 A 2/2014
CN 103828398 A 5/2014
(Continued)

OTHER PUBLICATIONS

LG Electronics, "UE Procedure in Mode 1 Communication," 3GPP TSG RAN WG1 Meeting #78, R1-143181; Dresden, Germany, Aug. 18-22, 2014, 5 pages.
(Continued)

Primary Examiner — Khaled M Kassim
Assistant Examiner — Zhaohui Yang
(74) Attorney, Agent, or Firm — Fish & Richardson P.C.

(57) ABSTRACT

Embodiments of the present disclosure provide a data transmission method and apparatus. The method includes: receiving, by user equipment UE, first synchronization source configuration information on a first carrier; determining, a first synchronization source based on the first synchronization source configuration information; determining that synchronization with the first synchronization source fails; determining a second synchronization source and a transmission resource; and transmitting data on a second carrier using the determined transmission resource and based on the second synchronization source, where the first synchronization source is used to provide the UE with a synchronization clock required for transmitting the data on the second carrier, and a frequency of the first carrier is different from a frequency of the second carrier.

16 Claims, 5 Drawing Sheets

(56) References Cited

U.S. PATENT DOCUMENTS

| | | | | |
|---|---|---|---|---|
| 2009/0286569 | A1* | 11/2009 | Rousu | H04B 1/0458 455/553.1 |
| 2013/0077512 | A1 | 3/2013 | Chang et al. | |
| 2014/0086234 | A1 | 3/2014 | Ogawa | |
| 2015/0327201 | A1* | 11/2015 | He | H04W 48/16 370/336 |
| 2016/0037466 | A1* | 2/2016 | Yang | H04W 48/14 370/350 |
| 2016/0374038 | A1 | 12/2016 | Wang | |
| 2016/0374039 | A1 | 12/2016 | Khoryaev et al. | |
| 2017/0054204 | A1* | 2/2017 | Changalvala | H01Q 1/2291 |
| 2017/0230926 | A1 | 8/2017 | Seo et al. | |
| 2017/0265154 | A1 | 9/2017 | Seo et al. | |
| 2017/0339652 | A1 | 11/2017 | Yasukawa et al. | |
| 2019/0037513 | A1* | 1/2019 | Yang | H04W 76/14 |
| 2019/0097751 | A1* | 3/2019 | Li | H04W 56/00 |

FOREIGN PATENT DOCUMENTS

| | | |
|---|---|---|
| CN | 104938000 A | 9/2015 |
| CN | 105493581 A | 4/2016 |
| CN | 105684529 A | 6/2016 |
| CN | 105850197 A | 8/2016 |
| JP | 2015195584 A | 11/2015 |
| WO | 2015066524 A1 | 5/2015 |
| WO | 2015168931 A1 | 11/2015 |
| WO | 2015194859 A1 | 12/2015 |
| WO | 2016036182 A1 | 3/2016 |

OTHER PUBLICATIONS

Office Action issued in Chinese Application No. 201910506946.8 on Apr. 14, 2020, 20 pages (with English translation).

Office Action issued in Chinese Application No. 201910506946.8 on Feb. 6, 2020, 21 pages (with English translation).

Office Action issued in Chinese Application No. 201680087663.9 on Feb. 3, 2020, 16 pages (with English translation).

Search Report issued in Chinese Application No. 201680087663.9 on Jan. 17, 2020, 4 pages.

Extended European Search Report issued in European Application No. 16912245.4 on May 6, 2019, 9 pages.

R1-165045—Nokia et al., "Prioritization of Sidelink Synchronization Sources," 3GPP TSG-RAN WG1 Meeting #85, Nanjing, China, Apr. 23-27, 2016, 4 pages.

CATT, "Synchronization enhancement in PC5-based V2V ", 3GPP TSG RAN WG1 Meeting #82bis R1-155225, Malmö, Sweden, Oct. 5-9, 2015, total 4 pages.

3GPP TS 36.101 V14.0.0 (2016-06);3rd Generation Partnership Project; Technical Specification Group Radio Access Network; Evolved Universal Terrestrial Radio Access (E-UTRA); User Equipment (UE) radio transmission and reception (Release 14), total 1057 pages.

NEC, "Synchronisation in V2X", 3GPP TSG RAN WG1 Meeting #84 R1-160395, St. Julian's, Malta, Feb. 15-19, 2016, total 3 pages.

3GPP TS 36.331 V13.2.0 (Jun . 2016); 3rd Generation Partnership Project; Technical Specification Group Radio Access Network; Evolved Universal Terrestrial Radio Access (E-UTRA); Radio Resource Control (RRC);Protocol specification (Release 13), total 623 pages.

Huawei, HiSilicon, "Sidelink Synchronization enhancement in V2V communication", 3GPP TSG RAN WG1 Meeting #85 R1-164105, Nanjing, China May 23-27, 2016, total 5 pages.

3GPP TS 36.133 V14.0.0 (Jun. 2016); 3rd Generation Partnership Project; Technical Specification Group Radio Access Network;Evolved Universal Terrestrial Radio Access (E-UTRA); Requirements for support of radio resource management(Release 14), total 1563 pages.

Ericsson, "Discussion on V2V Synchronization", 3GPP TSG RAN WG1 Meeting #82bis R1-155912, Malmo, Sweden, 4th Oct. 10, 2015, total 7 pages.

Huawei, HiSilicon, "The remaining issues for V2V PC5 synchronization priority", 3GPP TSG RAN WG1 Meeting #85 R1-164101, Nanjing, China May 23-27, 2016, total 6 pages.

International Search Report and Written Opinion issued in International Application No. PCT/CN2016/094607 on May 2, 2017, 20 pages.

Office Action issued in Japanese Application No. 2019-507131 on Jun. 2, 2020, 11 pages (with English translation).

* cited by examiner

DATA TRANSMISSION METHOD AND APPARATUS

CROSS-REFERENCE TO RELATED APPLICATIONS

This application is a continuation of International Application No. PCT/CN2016/094607, filed on Aug. 11, 2016, the disclosure of which is hereby incorporated by reference in its entirety.

TECHNICAL FIELD

Embodiments of the present invention relate to the wireless communications field, and more specifically, to a data transmission method and apparatus.

BACKGROUND

Currently, an in-vehicle device may obtain traffic information or receive an information service in time through vehicle-to-vehicle (V2V) communication, vehicle-to-infrastructure (V2I) communication, vehicle-to-pedestrian (V2P) communication, vehicle-to-network (V2N) communication, and the like. V2V and V2I are used as a common example. An in-vehicle device may broadcast, to another surrounding in-vehicle device through the V2V communication, information such as a speed, a driving direction, or a specific position of the vehicle, or whether an emergency braking is performed, so that the driver can obtain such information to better know a status of traffic outside a line of sight, to discover early and avoid a risk. For the V2I communication, in addition to exchanges of the foregoing security information, a roadside infrastructure may further provide various types of service information for the in-vehicle device, enable the in-vehicle device to access a data network, charge the vehicle without stopping the vehicle, and provide in-vehicle entertainment, so that transportation is more intelligent. The foregoing communication manners may be collectively referred to as vehicle-to-everything (V2X) communication herein, data in V2X transmission is referred to as V2X data, and a network used for V2X communication is referred to as Internet of Vehicles.

A transmission carrier used by user equipment (UE) for V2X transmission and a service carrier on which the UE camps may be different carriers, in other words, the transmission carrier and the service carrier may be located on different frequencies.

When the transmission carrier and the service carrier are located on different frequencies, a base station may configure, by using the service carrier, a synchronization source for the transmission carrier used by the UE to transmit V2X data. The UE may obtain, based on the synchronization source, a synchronization clock on the transmission carrier, and transmit data. For example, the base station configures, for the UE, a global navigation satellite system (GNSS) as the synchronization source of the transmission carrier for the V2X data, and all resources configured by the base station for the UE are based on a synchronization source clock (namely, a GNSS clock). Based on a specific GNSS moment, the UE may calculate a frame number and a subframe number that are corresponding to the moment. When allocating a resource to the UE, based on the GNSS clock, the base station may indicate a specific time-frequency location of a transmission resource that may be used by the UE (for example, all frequency domain resources of a tenth subframe of a frame #1 may be used to transmit V2X data). The UE may send data when a frame number and a subframe number that are corresponding to a current GNSS moment arrives at a moment of a resource allocated by the base station.

However, the UE may occasionally be out of synchronization with the synchronization source, in other words, synchronization between the UE and the synchronization source may fail. For example, when the UE enters a tunnel or a garage, the UE may not receive a signal sent by the GNSS. In this case, the UE cannot obtain a frame number and a subframe number. Consequently, the UE cannot determine a valid moment of a resource allocated by the base station, and the UE cannot transmit data normally.

SUMMARY

Embodiments of the present invention provide a data transmission method and apparatus, so as to implement normal data transmission after user equipment is out of synchronization with a synchronization source.

According to a first aspect, a data transmission method is provided, including: receiving, by user equipment UE, first synchronization source configuration information on a first carrier, where the first synchronization source configuration information is used to determine a first synchronization source; determining, by the UE, the first synchronization source based on the first synchronization source configuration information, where the first synchronization source is used to provide the UE with a synchronization clock required for transmitting data on a second carrier, and a frequency of the first carrier is different from a frequency of the second carrier; determining, by the UE, that synchronization with the first synchronization source fails; determining, by the UE, a second synchronization source and a transmission resource; and transmitting, by the UE, the data on the second carrier by using the transmission resource and based on the second synchronization source.

By using the foregoing solution, the user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

In a possible design, data may be device-to-device (D2D) data, V2X data, and other data transmitted in a direct connection communication manner. In particular, data in this embodiment of the present invention is V2X data, and the V2X data is V2X service-related data.

In a possible design, the UE may always be within a network coverage area of the base station. In other words, when the UE detects that signal quality of the base station meets an access requirement, the UE in a connected state may normally exchange signaling and data with the base station, and the UE in an idle state may normally receive system information and paging information sent by the base station.

In a possible design, the method further includes: the determining, by the UE, that synchronization with the first synchronization source fails includes any one of the following manners: if the UE does not receive a synchronization signal from the first synchronization source when a synchronization timer of the UE exceeds a specified time, determining, by the UE, that the synchronization with the first synchronization source fails; when strength of a synchronization signal received by the UE from the first synchronization source is less than a first preset threshold, determining, by the UE, that the synchronization with the first synchronization source fails; and when average strength of synchronization signals received by the UE from the first synchronization source in specified duration T is less than a second preset threshold, determining, by the UE, that the synchronization with the first synchronization source fails.

In a possible design, a start moment of the synchronization timer may be a moment at which a latest synchronization signal is received.

In a possible design, the determining, by the UE, that synchronization with the first synchronization source fails includes: when the UE detects the second synchronization source, signal strength of the second synchronization source is greater than a third preset threshold, and a priority of the second synchronization source is higher than a priority of the first synchronization source, determining, by the UE, that the synchronization with the first synchronization source fails.

In a possible design, the method further includes: determining, by the UE, the priorities of the first synchronization source and the second synchronization source based on first preconfigured information; or receiving, by the UE, a broadcast message on the first carrier, and determining the priorities of the first synchronization source and the second synchronization source based on the broadcast message; or receiving, by the UE, radio resource control RRC dedicated signaling on the first carrier, and determining the priorities of the first synchronization source and the second synchronization source based on the RRC dedicated signaling.

The first preconfigured information, the broadcast messages, or the RRC dedicated signaling includes priority information of the synchronization sources.

Optionally, in a possible design, the first synchronization source configuration information includes the priority information of the synchronization sources, so that the priorities of the first synchronization source and the second synchronization source can be determined based on the first synchronization source configuration information.

In a possible design, the determining, by the UE, a second synchronization source and a transmission resource that are required for transmitting the data includes: obtaining, by the UE, second synchronization source configuration information by using preconfigured information or by using signaling configuration information received on the first carrier, where the second synchronization source configuration information carries an identifier of the second synchronization source, and determining, by the UE, the second synchronization source based on the identifier of the second synchronization source; or using, by the UE, a clock of the UE as the second synchronization source.

In a possible design, when it is determined, by detecting a new synchronization source, that the first synchronization source fails, the determining, by the UE, the second synchronization source based on the identifier of the second synchronization source may be that the UE detects the second synchronization source based on the identifier. When it is detected that the signal strength of the second synchronization source is greater than a specified value and the priority of the second synchronization source is greater than the priority of the first synchronization source, it may be determined that the first synchronization source fails and the second synchronization source is used as the new synchronization source.

In a possible design, the determining, by the UE, a second synchronization source and a transmission resource includes: obtaining, by the UE, resource pool configuration information, where the resource pool configuration information is preconfigured, or the resource pool configuration information is obtained based on signaling configuration information received on the first carrier; and determining, by the UE, a transmission resource pool based on the resource pool configuration information, and determining the transmission resource based on the transmission resource pool.

In a possible design, the determining, by the UE, a second synchronization source and a transmission resource includes: receiving, by the UE, resource scheduling information on the first carrier; and determining, by the UE, the transmission resource based on the resource scheduling information, where the resource scheduling information is dynamic scheduling information or semi-persistent scheduling information.

In a possible design, the method further includes: after the UE determines that the synchronization with the first synchronization source fails, sending, by the UE, indication information to an access network device, where the indication information is used to indicate that the synchronization between the UE and the first synchronization source fails.

In a possible design, the method further includes: sending, by the UE, identification information of the second synchronization source to the access network device, where the identification information of the second synchronization source is used to indicate that the UE transmits the data on the second carrier based on a clock of the second synchronization source.

In a possible design, identification information of the first synchronization source carries an identifier of the first synchronization source, and the determining, by the UE, the first synchronization source based on the first synchronization source configuration information includes: determining, by the UE, the first synchronization source based on the identification information of the first synchronization source.

In a possible design, the first synchronization source is a global navigation satellite system GNSS.

A synchronization source used in this embodiment of the present invention is not specifically limited. For example, the synchronization source in this embodiment of the present invention may be a GNSS, or may be a mobile terminal synchronized with a GNSS, a cell synchronized with a GNSS, a current cell serving the UE, a preset cell, or the like.

In a possible design, the transmitting, by the UE, the data on the second carrier by using the transmission resource and based on the second synchronization source includes: transmitting, by the UE, the data in a direct connection communication manner on the second carrier based on the second synchronization source.

In this embodiment of the present invention, the V2X data may be transmitted in a direct connection communication manner or in a communication manner in which a base station acts as a relay.

In a possible design, the data is vehicle-to-everything V2X communication data.

The data in this embodiment of the present invention may be vehicle-to-everything V2X communication data. In this way, a driver can know a status of traffic outside a line of sight through V2X data transmission, to discover early and avoid a risk, thereby reducing traffic accidents.

According to a second aspect, a data transmission method is provided, including: sending, by an access network device, first synchronization source configuration information to user equipment UE by using a first carrier, where the first synchronization source configuration information carries an identifier of a first synchronization source, and the first synchronization source configuration information is used to determine the first synchronization source; and receiving, by the access network device on the first carrier, indication information sent by the UE, where the indication information is used to indicate that synchronization between the UE and the first synchronization source fails, the first synchronization source is used to provide the UE with a synchronization clock required for transmitting data on a second carrier, and a frequency of the first carrier is different from a frequency of the second carrier.

The access network device in this embodiment of the present invention configures a synchronization source for the UE, and after synchronization between the UE and the synchronization source fails, receives indication information that is sent by the UE and that indicates that the synchronization with the synchronization source fails. In this way, after the synchronization between the UE and the synchronization source fails, based on the indication information, the access network device may skip sending signaling to the UE or configuring a resource corresponding to the first synchronization source for the UE, so as to save a signaling overhead.

In a possible design, the method further includes: sending, by the access network device, second synchronization source configuration information to the UE on the first carrier, so that the UE determines a second synchronization source based on the second synchronization source configuration information after the synchronization with the first synchronization source fails, and transmits the data on the second carrier based on the second synchronization source.

In a possible design, the access network device may configure, for the UE, a transmission resource corresponding to the second synchronization source, and send the transmission resource to the UE, so that the UE transmits data on the transmission resource based on the second synchronization source. In this way, the UE can still perform normal data transmission after the synchronization with the first synchronization source fails.

In a possible design, the data is vehicle-to-everything V2X communication data.

According to a third aspect, a data transmission apparatus is provided, including: a receiving unit, configured to receive first synchronization source configuration information on a first carrier, where the first synchronization source configuration information is used to determine a first synchronization source; a processing unit, configured to determine the first synchronization source based on the first synchronization source configuration information received by the receiving unit, where the first synchronization source is used to provide a synchronization clock required for transmitting data on a second carrier, and a frequency of the first carrier is different from a frequency of the second carrier, where the processing unit is further configured to determine that synchronization with the first synchronization source fails, and the processing unit is further configured to determine a second synchronization source and a transmission resource; and a transmission unit, configured to transmit the data on the second carrier by using the transmission resource and based on the second synchronization source determined by the processing unit.

In this embodiment of the present invention, user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

In a possible design, the processing unit is specifically configured to determine, in any one of the following manners, that the synchronization with the first synchronization source fails: if the UE does not receive a synchronization signal from the first synchronization source when a synchronization timer of the UE exceeds a specified time, determining, by the UE, that the synchronization with the first synchronization source fails; when strength of a synchronization signal received by the UE from the first synchronization source is less than a first preset threshold, determining, by the UE, that the synchronization with the first synchronization source fails; and when average strength of synchronization signals received by the UE from the first synchronization source in specified duration T is less than a second preset threshold, determining, by the UE, that the synchronization with the first synchronization source fails.

In a possible design, the processing unit is configured to: when the second synchronization source is detected, signal strength of the second synchronization source is greater than a third preset threshold, and a priority of the second synchronization source is higher than a priority of the first synchronization source, determine that the synchronization with the first synchronization source fails.

In a possible design, the processing unit is further configured to: determine the priorities of the first synchronization source and the second synchronization source based on first preconfigured information; or receive a broadcast message on the first carrier, and determine the priorities of the first synchronization source and the second synchronization source based on the broadcast message; or receive radio resource control RRC dedicated signaling on the first carrier, and determine the priorities of the first synchronization source and the second synchronization source based on the RRC dedicated signaling.

In a possible design, the processing unit is further configured to: obtain second synchronization source configuration information by using preconfigured information or by using signaling configuration information received on the first carrier, where the second synchronization source configuration information carries an identifier of the second synchronization source; and determine the second synchronization source based on the identifier of the second synchronization source; or the method is performed by user equipment UE, and a clock of the UE is used as the second synchronization source.

In a possible design, the processing unit is specifically configured to: obtain resource pool configuration information, where the resource pool configuration information is preconfigured, or the resource pool configuration information is obtained based on signaling configuration information received on the first carrier; determine a transmission resource pool based on the resource pool configuration information; and determine the transmission resource based on the transmission resource pool.

In a possible design, the processing unit is specifically configured to receive resource scheduling information on the first carrier, and determine the transmission resource based on the resource scheduling information, where the resource scheduling information is dynamic scheduling information or semi-persistent scheduling information.

In a possible design, the apparatus further includes: a sending unit, configured to send indication information to the access network device after the UE determines that synchronization with the first synchronization source fails, where the indication information is used to indicate that the synchronization with the first synchronization source fails.

In a possible design, the apparatus is the user equipment UE, and the sending unit is further configured to send identification information of the second synchronization source to the access network device, where the identification information of the second synchronization source is used to indicate a current synchronization source of the UE.

In a possible design, identification information of the first synchronization source carries an identifier of the first synchronization source, and the processing unit is specifically configured to determine the first synchronization source based on the identification information of the first synchronization source.

In a possible design, the first synchronization source is a global navigation satellite system GNSS.

In a possible design, the transmission unit is specifically configured to transmit the data on the second carrier based on the second synchronization source in a direct connection communication manner.

In a possible design, the data is vehicle-to-everything V2X communication data.

The data transmission apparatus in the third aspect of the embodiments of the present invention may be corresponding to the data transmission method in the first aspect of the method embodiment of the present invention, and units/modules of the apparatus and other operations and/or functions described above are respectively for implementing corresponding procedures of the method shown in the first aspect. Details are not described herein again for brevity.

In a possible design, the receiving unit may be a receiver, and the receiver may be configured to receive the first synchronization source configuration information on the first carrier, where the first synchronization source configuration information is used to determine the first synchronization source.

The receiver may further perform steps performed by the receiving unit in the possible designs in the third aspect. Details are not described herein again to avoid repetition.

In a possible design, the processing unit may be a processor, and the processor may be configured to determine the first synchronization source based on the first synchronization source configuration information, determine that the synchronization with the first synchronization source fails, and determine the second synchronization source and the transmission resource. The first synchronization source is used to provide the synchronization clock required for transmitting the data on the second carrier. The frequency of the first carrier is different from the frequency of the second carrier.

The processor may perform steps performed by the processing unit in the possible designs in the third aspect. Details are not described herein again to avoid repetition.

In a possible design, the transmission unit may be a sender, configured to transmit the data on the second carrier by using the transmission resource and based on the second synchronization source.

The sender may perform steps performed by the processing unit in the possible designs in the third aspect. Details are not described herein again to avoid repetition.

In a possible design, the transmission unit may be a transmitter. The transmitter may be configured to transmit the data on the second carrier by using the transmission resource and based on the second synchronization source determined by the processing unit.

The transmitter may perform steps performed by the transmission unit and/or the sending unit in the possible designs in the third aspect. Details are not described herein again to avoid repetition.

According to a fourth aspect, a data transmission apparatus is provided, including: a sending unit, configured to send first synchronization source configuration information to user equipment UE by using a first carrier, where the first synchronization source configuration information carries an identifier of a first synchronization source, and the first synchronization source configuration information is used to determine the first synchronization source; and a receiving unit, configured to receive, on the first carrier, indication information sent by the UE, where the indication information is used to indicate that synchronization between the UE and the first synchronization source fails, the first synchronization source is used to provide the UE with a synchronization clock required for transmitting data on a second carrier, and a frequency of the first carrier is different from a frequency of the second carrier.

An access network device in this embodiment of the present invention configures a synchronization source for the UE, and after synchronization between the UE and the synchronization source fails, receives indication information that is sent by the UE and that indicates that the synchronization with the synchronization source fails. In this way, after the synchronization between the UE and the synchronization source fails, based on the indication information, the access network device may skip sending signaling to the UE or configuring a resource for the UE, so as to save a signaling overhead.

In a possible design, the sending unit is further configured to send second synchronization source configuration information to the UE on the first carrier, where the second synchronization source configuration information is used by the UE to determine a second synchronization source based on the second synchronization source configuration information after the synchronization with the first synchronization source fails, and transmit the data on the second carrier based on the second synchronization source.

The data transmission apparatus in the fourth aspect of the embodiments of the present invention may be corresponding to the data transmission method in the second aspect of the method embodiment of the present invention, and units/modules of the apparatus and other operations and/or functions described above are respectively for implementing corresponding procedures of the method shown in the second aspect. Details are not described herein again for brevity.

In a possible design, the sending unit may be a transmitter, and the transmitter may be configured to send the first synchronization source configuration information to the user equipment UE by using the first carrier, where the first synchronization source configuration information carries the identifier of the first synchronization source, and the first synchronization source configuration information is used to determine the first synchronization source.

In a possible design, the receiving unit may be a receiver, and the receiver may be configured to receive the indication information on the first carrier, where the indication information is used to indicate that the synchronization between the UE and the first synchronization source fails, the first synchronization source is used to provide the UE with the synchronization clock required for transmitting the data on the second carrier, and the frequency of the first carrier is different from the frequency of the second carrier.

In a possible design, the transmitter may further be configured to send the second synchronization source configuration information to the UE, where the second synchronization source configuration information is used by the UE to determine the second synchronization source based on the second synchronization source configuration information after the synchronization with the first synchronization source fails, and transmit the data on the second carrier based on the second synchronization source.

According to a fifth aspect, an embodiment of the present invention provides a computer storage medium, configured to store a computer software instruction used by the foregoing access network device. The computer storage medium includes a program designed for performing the second aspect or the possible designs of the second aspect.

By using the foregoing solution, after synchronization between the UE and a synchronization source fails, based on indication information that is sent by the UE and that indicates that the synchronization with the synchronization source fails, the access network device may skip sending signaling to the UE or configuring a resource corresponding to the first synchronization source for the UE, so as to save a signaling overhead.

According to a sixth aspect, an embodiment of the present invention provides a computer storage medium, configured to store a computer software instruction used by the foregoing UE. The computer storage medium includes a program designed for performing the first aspect or the possible designs of the first aspect.

By using the foregoing solutions, the user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio data (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WiMAX) communications system.

A base station may be a base station (BTS) in GSM or CDMA, a base station (NodeB, NB) in WCDMA, or may be an evolved NodeB (eNB or e-NodeB) in LTE. This is not limited in the embodiments of the present invention. However, for ease of description, a base station or an eNB is used as an example for description in the following embodiments.

User equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular" phone) or a computer with a mobile terminal function. For example, the user equipment may be a portable, pocket-sized, handheld, computer built-in, or in-vehicle mobile apparatus, which exchanges voice and/or data with the radio access network. In particular, the user equipment in the embodiments of the present invention may be an in-vehicle device.

Figure 1:
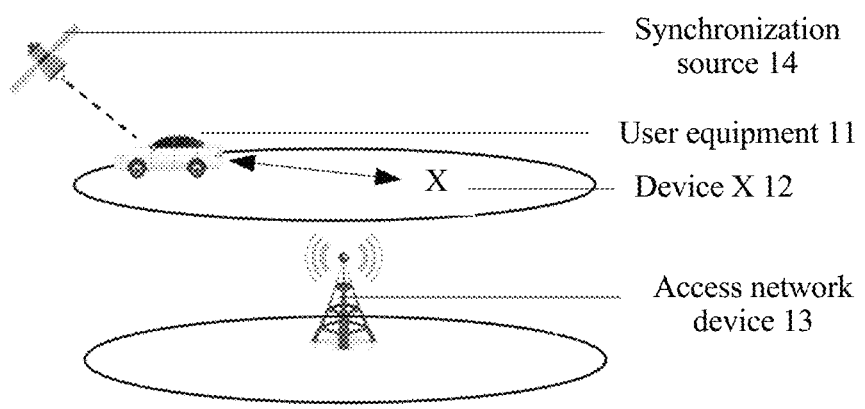
FIG. 1 is a schematic diagram of a scenario of a communications system applicable to an embodiment of the present invention.

FIG. 1 is a schematic diagram of a scenario of a communications system applicable to an embodiment of the present invention. The communications system in FIG. 1 includes user equipment UE 11, a device X 12, an access network device 13, and a synchronization source 14.

The UE in this embodiment of the present invention may be an in-vehicle device, or may be a terminal-type roadside unit device, a handheld terminal, a wearable device, or the like. The access network device in this embodiment of the present invention may be a base station, a station-type roadside unit, or the like. The device X in this embodiment of the present invention may be any device. For example, the device X may be an in-vehicle device, a network, a pedestrian, a roadside infrastructure, or the like.

For example, the UE is an in-vehicle device and the access network device is a base station herein. V2X data transmission may be performed between the UE and the device X, and the UE 11 is within a signal coverage area of the base station 13. A transmission carrier of the V2X data transmission may be different from a service carrier, deployed by the base station, on which the UE camps, in other words, frequencies of the transmission carrier and the service carrier may be different.

A synchronization source of the UE on a V2X data transmission carrier may be configured by using a service carrier. For example, the base station configures, for the UE, a GNSS as the synchronization source of the V2X data transmission carrier. All resources configured by the base station for the UE are based on a synchronization source GNSS clock. The UE may calculate, based on a GNSS moment, a frame number and a subframe number that are corresponding to the moment. When allocating a resource to the UE, the base station may indicate a specific time-frequency location of a transmission resource that may be used by the UE, for example, a frame number and a subframe number that are of the transmission resource that may be used by the UE. The UE may send data when a frame number and a subframe number that are corresponding to a GNSS moment are equal to the frame number and the subframe number that are of the transmission resource and that are indicated by the base station.

However, the UE may be out of synchronization with the synchronization source, in other words, synchronization between the UE and the synchronization source may fail. For example, when the UE enters a tunnel or a garage, the UE may not receive a signal sent by the GNSS. In this case, the UE cannot obtain a frame number and a subframe number. Consequently, the UE cannot determine a valid moment of a resource allocated by the base station, and the UE cannot transmit data normally.

When a service carrier and a data transmission carrier are located on different carriers and the UE does not synchronize with a current synchronization source allocated by the base station, how to ensure normal transmission of V2X data by the UE is a main technical problem to be resolved in the present invention.

Figure 2:
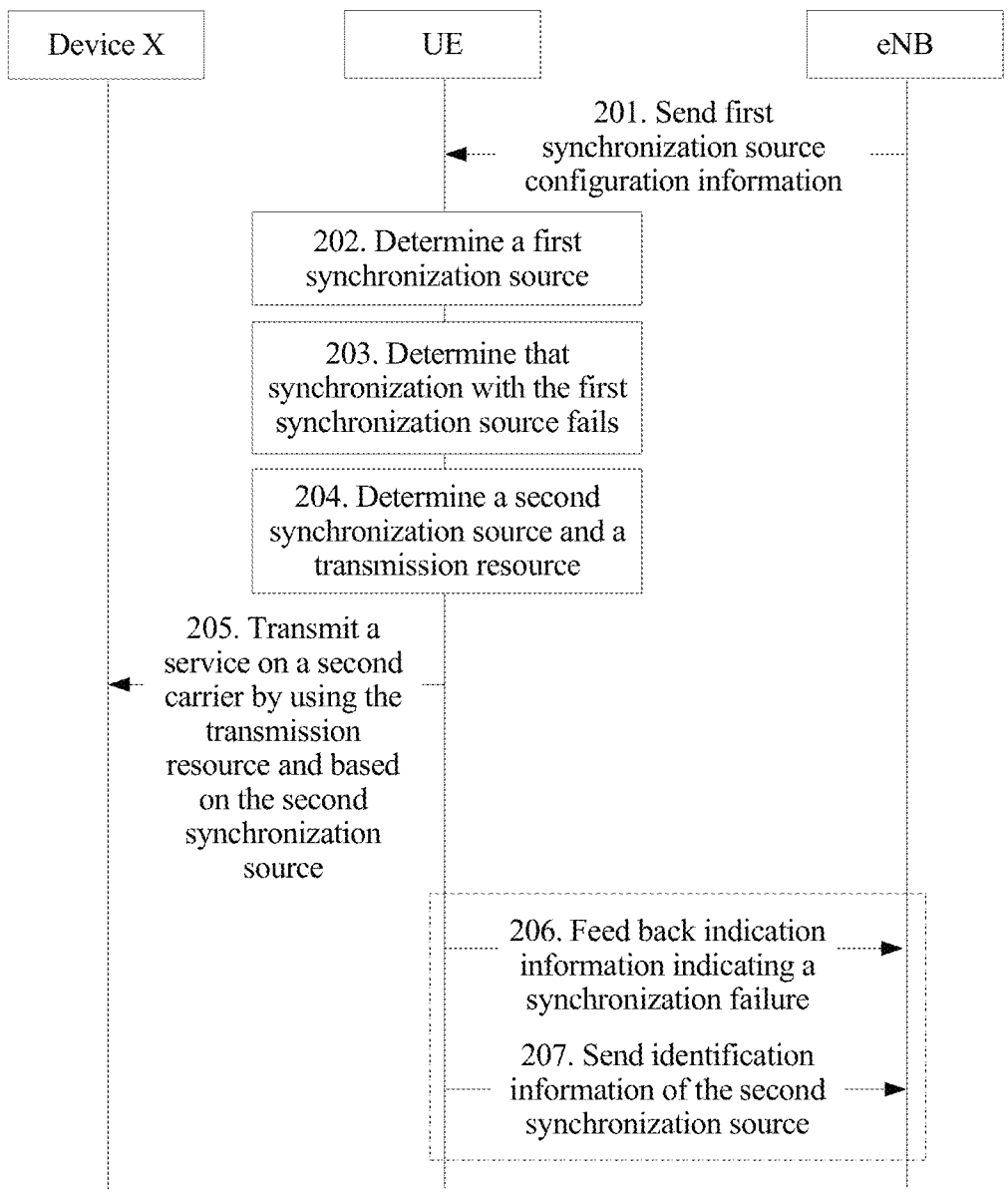
FIG. 2 is a schematic interactive flowchart of a data transmission method according to an embodiment of the present invention.

FIG. 2 is a schematic interactive flowchart of a data transmission method according to an embodiment of the present invention. In description of this embodiment of the present invention, for example, an access network device is an eNB and data is V2X data. In a method procedure, information exchange between UE and an eNB and information exchange between the UE and a device X are used as examples for description of data transmission.

201. The eNB sends first synchronization source configuration information to the UE on a first carrier, and the UE receives the first synchronization source configuration information sent by the eNB on the first carrier.

The eNB sends the first synchronization source configuration information to the UE. The first synchronization source configuration information may be used to configure, for the UE, a current synchronization source required for transmitting V2X data on a second carrier.

In an optional embodiment, the first synchronization source configuration information carries an identifier of a first synchronization source, so that the UE determines, based on the identifier of the first synchronization source, the current synchronization source required for transmitting V2X data. The first synchronization source configuration information in this embodiment of the present invention may indicate that the first synchronization source is any one of a GNSS, a mobile terminal or a cell synchronized with a GNSS, a cell currently serving the UE, a specified cell, and a specified mobile terminal synchronization source. Preferably, the first synchronization source configuration information may indicate that the first synchronization source is a GNSS, and correspondingly the identifier of the first synchronization source is a GNSS identifier.

The eNB is deployed on the first carrier, and V2X data transmission is performed by using the second carrier. A frequency of the first carrier is different from a frequency of the second carrier. For example, the frequency of the first carrier (a service carrier of the UE) may be 2 GHz, and the frequency of the second carrier (a transmission carrier used by the UE to transmit V2X data) may be 5.9 GHz. The service carrier may be used to configure a transmission resource (for example, a dynamic transmission resource, a semi-persistent transmission resource, a transmission resource pool, and a receiving resource pool) on the transmission carrier for the UE. The configuration information may further include frequency information of the second carrier, so that a first UE may perform data transmission on the frequency of the second carrier. Optionally, no base station is deployed on the second carrier.

In an optional embodiment, the V2X data may be transmitted in a direct connection communication manner in which two devices directly communicate with each other, or may be transmitted in a communication manner in which a base station acts as a relay. Preferably, the V2X data is transmitted on the second carrier in the direct connection communication manner.

In an optional embodiment, the eNB may send the configuration information to the UE by using radio resource control (RRC) dedicated signaling or a broadcast message.

In an optional embodiment, the UE may always be within a network coverage area of the eNB. When the UE detects that signal quality of the base station meets an access requirement, the UE in a connected state may normally exchange signaling and data with the base station, and the UE in an idle state may normally receive system information and paging information sent by the base station.

202. The UE determines a first synchronization source.

The UE receives the first synchronization source configuration information, and uses, based on the first synchronization source configuration information, the first synchronization source as a synchronization source for transmitting the V2X data.

When the first synchronization source configuration information carries the identifier of the first synchronization source, the UE may determine the first synchronization source based on the identifier of the first synchronization source.

In an optional implementation, the UE may further implement synchronization between the UE and the first synchronization source. For example, when the first synchronization source is a GNSS, the UE may directly synchronize with the GNSS system by using a GNSS receiver of the UE, or may search for a GNSS-dedicated direct-connection link synchronization signal to use a mobile terminal with a GNSS clock as an intermediate synchronization source, and synchronize with the intermediate synchronization source to implement synchronization with the GNSS system.

The UE may implement data transmission by using a corresponding resource and based on the synchronization source. For example, after synchronizing with the first synchronization source, the UE may receive resource allocation information sent by the base station. The resource allocation information indicates at least one of a dynamic transmission resource, a semi-persistent transmission resource, a sending resource pool, and a receiving resource pool that are available on a direct connection link. The resource allocation information herein is configured based on a clock of the first synchronization source. The UE transmits data by using a corresponding resource and based on the received resource allocation information. Specifically, the UE may send corresponding V2X data by using a sending resource and receive corresponding V2X data by using a receiving resource.

203. The UE determines that synchronization with the first synchronization source fails.

Step 202 indicates that the UE may implement data transmission by using a corresponding resource and based on the first synchronization source. However, the UE may be out of synchronization with the first synchronization source, for example, when the UE enters a tunnel or a garage.

The UE may determine a failure of the synchronization with the first synchronization source by using many methods, and a specific determining method is not limited in this embodiment of the present invention. For example, a synchronization timer on the UE may start timing when a latest synchronization signal is received. If the UE does not receive a synchronization signal from the first synchronization source when the synchronization timer of the UE exceeds a specified time, it may be considered that the synchronization between the UE and the first synchronization source fails. For another example, the UE may receive a synchronization signal from a synchronization source. When strength of a synchronization signal received by the UE from the first synchronization source is less than a first preset threshold, it may be considered that the synchronization between the UE and the first synchronization source fails. For still another example, when average strength of synchronization signals received by the UE from the first synchronization source in specified duration T is less than a second preset threshold, it may be considered that the synchronization between the UE and the first synchronization source fails.

In an optional embodiment, the failure of the synchronization between the UE and the first synchronization source may be that the UE is out of synchronization with the first synchronization source. Alternatively, when the UE detects a better synchronization source other than the first synchronization source, it may also be considered that the synchronization between the UE and the first synchronization source fails. For example, when the UE detects a second synchronization source, signal strength of the second synchronization source is greater than a third preset threshold, and a priority of the second synchronization source is higher than a priority of the first synchronization source, the UE may determine that the synchronization with the first synchronization source fails. For another example, when the UE detects a second synchronization source, signal strength of the second synchronization source is greater than a third preset threshold and signal strength of the first synchronization source is less than a fourth threshold, and a priority of the second synchronization source is equal to or less than a priority of the first synchronization source, the UE may determine that the synchronization with the first synchronization source fails.

A priority of a synchronization source may be preconfigured by the system, or may be configured by the base station, for example, the base station sends system broadcast information to the UE on the first carrier for configuration, or the base station sends radio resource control RRC dedicated signaling to the UE on the first carrier for configuration.

204. The UE determines a second synchronization source and a transmission resource.

In an optional embodiment, when the UE detects the better synchronization source other than the first synchronization source and then determines that the synchronization between the UE and the first synchronization source fails in step 103, the UE may directly determine the detected better synchronization source as the second synchronization source in step 104. In addition, a transmission resource may be allocated based on a clock of the second synchronization source. The transmission resource herein may be configured by the base station or may be preconfigured by the system.

In an optional embodiment, the second synchronization source and a corresponding transmission resource may be obtained through preconfiguration or may be obtained by the base station through signaling configuration. The signaling configuration of the base station may be that the UE receives, on the first carrier, signaling configuration information sent by the base station.

Specifically, the UE may determine, in the following manner, the second synchronization source required for transmitting V2X data. The UE obtains second synchronization source configuration information sent by the access network device on the first carrier, the second synchronization source configuration information may carry an identifier of the second synchronization source, and the UE may determine, based on the identifier of the second synchronization source, the second synchronization source required for transmitting V2X data. The second synchronization source configuration information sent by the access network device to the UE may be configured by using a broadcast message or may be configured by sending radio resource control RRC dedicated signaling. Alternatively, the UE may obtain, by using preconfigured information, second synchronization source configuration information that carries an identifier of the second synchronization source, and determine, based on the identifier of the second synchronization source, the second synchronization source required for transmitting V2X data. Alternatively, the UE may use a clock of the UE as the second synchronization source.

In an optional embodiment, the clock of the UE may be a clock or a timer currently independently maintained inside the UE. In an optional embodiment, the UE may use a clock of the current base station as the clock of the UE, or may independently determine a clock as the clock of the UE.

The UE may determine, in the following manner, a transmission resource required for transmitting V2X data. The UE obtains resource pool configuration information, determines a transmission resource pool based on the transmission resource pool configuration information, and determines the transmission resource based on the transmission resource pool. The resource pool configuration information may be preconfigured information, or may be configured by the access network device by using signaling. The resource pool configuration information indicates available transmission resource pools, for example, a receiving resource pool or a sending resource pool. In an optional embodiment, the UE may randomly select one resource pool from the available resource pools, and select one resource from the selected resource pool as the transmission resource for transmitting the data on the second carrier, in other words, performing corresponding data transmission or reception.

In addition, the transmission resource in this embodiment of the present invention may be a dynamic transmission resource or a semi-persistent transmission resource. Specifically, the UE may alternatively determine, in the following manner, the transmission resource required for transmitting V2X data. The UE receives resource scheduling information sent by the access network device, and determines the transmission resource based on the resource scheduling information, so that the UE may transmit the data on the second carrier by using the determined transmission resource and based on the second synchronization source. The resource scheduling information herein is used for dynamic resource scheduling or semi-persistent resource scheduling. In the semi-persistent resource scheduling in this embodiment of the present invention, a resource number during first scheduling may be specified, and a change rule or period of a resource number during each scheduling after the first scheduling may be specified, so as to perform semi-persistent resource scheduling at intervals of a specified quantity of resources. The dynamic resource scheduling in this embodiment of the present invention means that a resource is dynamically scheduled each time the resource is used.

In an optional embodiment, the UE determines the transmission resource by using the clock of the second synchronization source as a reference synchronization clock.

205. The UE transmits data on a transmission carrier (for example, a second carrier) by using the transmission resource and based on the second synchronization source determined in step 204, and the device X receives, on the second carrier, the data transmitted by the UE.

In this embodiment of the present invention, that the UE transmits data on the transmission carrier may be that the UE sends data or that the UE receives data. A corresponding transmission resource may be a sending resource or a receiving resource.

Herein, that the UE transmits the data on the second carrier is that the UE performs data transmission with another device (for example, the device X). The UE in this embodiment of the present invention may be an in-vehicle device, and the device X may be an in-vehicle device, a network, a roadside infrastructure, a handheld terminal of a pedestrian, or the like. Data transmitted between the UE and the device X may be V2X data.

206. The UE sends, to the eNB, indication information indicating that synchronization fails, and the eNB receives the indication information indicating that synchronization fails, which is sent by the UE.

Step 206 is an optional step. In an optional embodiment, after determining that the first synchronization source fails in step 203, the UE may feed back the indication information to the eNB, and the indication information is used to indicate that the synchronization between the UE and the first synchronization source fails. The UE feeds back a synchronization failure to the eNB, so that the eNB does not need to send signaling, a configuration resource, and the like to the UE, so as to reduce signaling overheads. Certainly, the eNB may also send new synchronization source configuration information to the UE, and optionally, the new synchronization source configuration information may be the second synchronization source configuration information.

It should be understood that step 206 may be performed before step 204 in which the new second synchronization source is re-determined, or step 206 may be performed after step 204, or step 206 and step 204 may be performed at the same time. This is not limited in this embodiment of the present invention.

207. The UE sends identification information of the second synchronization source to the eNB, and the eNB receives the identification information of the second synchronization source, which is sent by the UE.

Step 207 is an optional step. In an optional embodiment, after re-determining the new second synchronization source in step 204, the UE may further send the identification information of the second synchronization source to the eNB. The identification information of the second synchronization source may carry the identifier of the second synchronization source, and may be used to instruct the UE to use the clock of the second synchronization source as a synchronization clock required for transmitting the data on the second carrier. In this way, after receiving the identification information of the second synchronization source, the eNB may record related information of a current synchronization source (the second synchronization source) of the UE in the eNB, so that the eNB obtains a new synchronization source and uses a clock of the new synchronization source as a synchronization clock for resource configuration.

In particular, the data in this embodiment of the present invention may be V2X data.

In this embodiment of the present invention, user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

It should be understood that sequence numbers of steps in the procedure do not constitute a constraint or limitation on a time sequence of performing the steps. For example, step 207 may be performed at any moment after step 204 in which the new second synchronization source is re-determined, for example, step 207 is performed before or after step 205 in which data is transmitted, or step 207 and step 205 are performed at the same time. This is not limited in this embodiment of the present invention.

The foregoing embodiment is merely intended to help a person skilled in the art better understand the present invention, but is not intended to limit the protection scope of the present invention.

Figure 3:
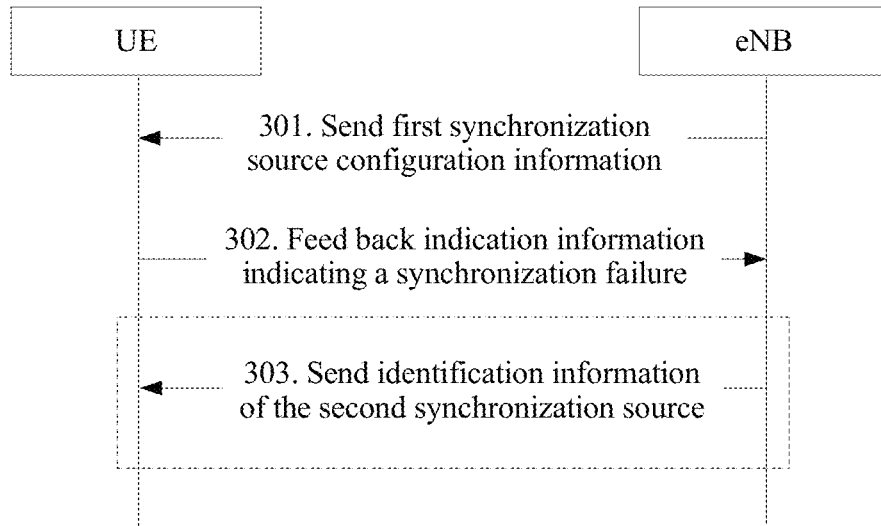
FIG. 3 is a schematic interactive flowchart of a data transmission method according to another embodiment of the present invention.

FIG. 3 is a schematic interactive flowchart of a data transmission method according to another embodiment of the present invention. To describe data transmission in this embodiment of the present invention, for example, an access network device is an eNB, V2X data is transmitted, and information is exchanged between UE and the eNB.

301. The eNB sends first synchronization source configuration information to the user equipment UE on a first carrier, and the UE receives the first synchronization source configuration information sent by the eNB on the first carrier.

The first synchronization source configuration information may carry an identifier of a first synchronization source. The eNB is deployed on the first carrier. The UE (for example, an eNB) receives the first synchronization source configuration information sent by a base station. The UE may synchronize with the first synchronization source based on the first synchronization source configuration information, and transmit data on a second carrier based on the first synchronization source.

302. The UE sends indication information to the eNB on the first carrier, and the eNB receives, on the first carrier, the indication information sent by the UE.

The indication information is used to indicate that the synchronization between the UE and the first synchronization source fails. After detecting that the synchronization with the first synchronization source fails, the UE may send the indication information to the eNB. For a method for determining a synchronization failure by the UE, refer to description in step 203 in FIG. 2. Details are not described herein again to avoid repetition.

The access network device in this embodiment of the present invention configures a synchronization source for the UE, and after synchronization between the UE and the synchronization source fails, receives indication information that is sent by the UE and that indicates that the synchronization with the synchronization source fails. In this way, after the synchronization between the UE and the synchronization source fails, based on the indication information, the access network device may skip sending signaling to the UE or configuring a resource corresponding to the first synchronization source for the UE, so as to save a signaling overhead.

303. The eNB may send second synchronization source configuration information to the UE on the first carrier, and the UE receives, on the first carrier, the second synchronization source configuration information sent by the eNB.

The second synchronization source configuration information is used by the UE to determine a second synchronization source based on the second synchronization source configuration information after the synchronization with the first synchronization source fails, and transmit the data on the second carrier based on the second synchronization source. A frequency of the first carrier is different from a frequency of the second carrier.

Step 303 is an optional step. After receiving the indication information indicating a synchronization failure, the eNB may reconfigure a synchronization source for the UE, for example, by sending the second synchronization source configuration information to the UE on the first carrier. The second synchronization source configuration information may include an identifier of the second synchronization source. After receiving the second synchronization source configuration information, the UE may synchronize with the second synchronization source based on the second synchronization source configuration information, so as to continue to transmit the data on the second carrier based on the second synchronization source, and ensure normal data transmission.

In an optional embodiment, if the second synchronization source is preconfigured, after the UE synchronizes with the second synchronization source, the eNB may receive identification information that is of the second synchronization source and that is sent by the UE, so that the base station obtains an identifier of a new synchronization source (the second synchronization source), and configures a transmission resource corresponding to the second synchronization source for the second synchronization source.

Step 303 is an optional step. In an optional embodiment, the access network device (for example, an eNB) may further send the second synchronization source configuration information to the UE on the first carrier. The second synchronization source configuration information is used by the UE to determine the second synchronization source based on the second synchronization source configuration information after the synchronization with the first synchronization source fails, and transmit the data on the second carrier based on the second synchronization source. The frequency of the first carrier is different from the frequency of the second carrier. This may ensure that after the synchronization between the UE and the first synchronization source fails, the access network device can learn of a new synchronization source (for example, the second synchronization source), so as to configure a transmission resource corresponding to the second synchronization source for the second synchronization source.

In an optional embodiment, the access network device may configure, for the UE, a transmission resource corresponding to the second synchronization source, and send the transmission resource to the UE, so that the UE transmits data on the transmission resource based on the second synchronization source. In this way, the UE can still perform normal data transmission after the synchronization with the first synchronization source fails.

In an optional embodiment, the data is vehicle-to-everything V2X communication data.

The foregoing describes in detail the data transmission method according to the embodiments of the present invention with reference to FIG. 2 and FIG. 3. The following describes block diagrams of a data transmission apparatus according to an embodiment of the present invention with reference to FIG. 4 to FIG. 7.

Figure 4:
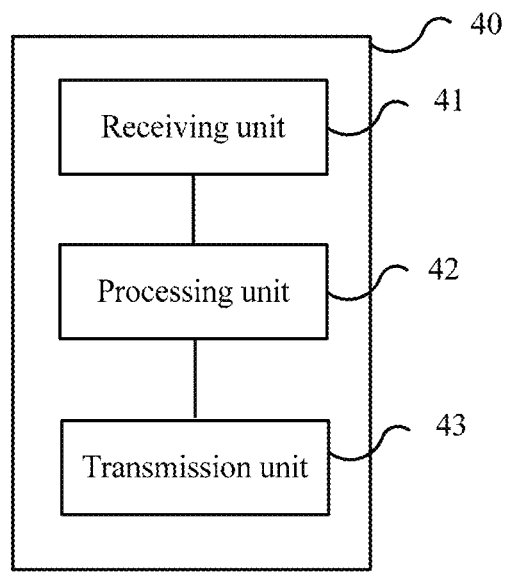
FIG. 4 is a block diagram of a data transmission apparatus according to an embodiment of the present invention.

FIG. 4 is a block diagram of a data transmission apparatus according to an embodiment of the present invention. The apparatus in FIG. 4 may perform steps performed by the UE in the method embodiment in FIG. 2. An apparatus 40 in FIG. 4 includes a receiving unit 41, a processing unit 42 and a transmission unit 43.

The receiving unit 41 is configured to receive first synchronization source configuration information on a first carrier, where the first synchronization source configuration information is used to determine a first synchronization source.

The processing unit 42 is configured to: determine the first synchronization source based on the first synchronization source configuration information received by the receiving unit; determine that synchronization with the first synchronization source fails; and determine a second synchronization source and a transmission resource. The first synchronization source is used to provide a synchronization clock required for transmitting data on a second carrier, and a frequency of the first carrier is different from a frequency of the second carrier.

The transmission unit 43 is configured to transmit the data on the second carrier by using the transmission resource and based on the second synchronization source determined by the processing unit.

By using the foregoing solution, the user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

The data transmission apparatus in this embodiment of the present invention may be applied to specific steps and an execution procedure of the UE in the data transmission method of the embodiments of the present invention, and units/modules of the apparatus and other operations and/or functions described above are respectively for implementing corresponding procedures of the UE in the method shown in FIG. 2. Details are not described herein again for brevity.

In an optional embodiment, the receiving unit may be a receiver, the processing unit may be a processor, the transmission unit can be a transmitter. The receiver, the processor, and the transmitter may be configured to respectively perform methods performed by the receiving unit, the processing unit, and the transmission unit. Details are not described again to avoid repetition.

Figure 5:
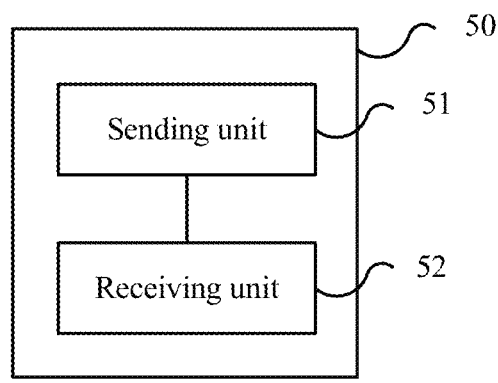
FIG. 5 is a block diagram of a data transmission apparatus according to another embodiment of the present invention.

FIG. 5 is a block diagram of a data transmission apparatus according to another embodiment of the present invention. The apparatus in FIG. 5 may perform steps performed by the eNB in the method embodiments in FIG. 2 and FIG. 3. An apparatus 50 in FIG. 5 includes a sending unit 51 and a receiving unit 52.

The sending unit 51 is configured to send first synchronization source configuration information to user equipment UE by using a first carrier. The first synchronization source configuration information carries an identifier of a first synchronization source, and the first synchronization source configuration information is used to determine the first synchronization source.

The receiving unit 52 is configured to receive indication information sent by the UE. The indication information is used to indicate that synchronization between the UE and the first synchronization source fails. The first synchronization source is used to provide the UE with a synchronization clock required for transmitting data on a second carrier. A frequency of the first carrier is different from a frequency of the second carrier.

By using the foregoing solution, the access network device configures a synchronization source for the UE, and after synchronization between the UE and the synchronization source fails, may receive indication information that is sent by the UE and that indicates that the synchronization with the synchronization source fails. In this way, after the synchronization between the UE and the synchronization source fails, based on the indication information, the access network device may skip sending signaling to the UE or configuring a resource corresponding to the first synchronization source for the UE, so as to save a signaling overhead.

In an optional embodiment, the sending unit 51 is further configured to send second synchronization source configuration information to the UE on the first carrier. The second synchronization source configuration information is used by the UE to determine a second synchronization source based on the second synchronization source configuration information after the synchronization with the first synchronization source fails, and transmit the data on the second carrier based on the second synchronization source.

In an optional embodiment, the eNB may reconfigure a synchronization source for the UE after receiving the indication information indicating a synchronization failure, for example, send the second synchronization source configuration information to the UE on the first carrier. The second synchronization source configuration information may include an identifier of the second synchronization source. After receiving the second synchronization source configuration information, the UE may synchronize with the second synchronization source based on the second synchronization source configuration information, so as to continue to transmit the data on the second carrier based on the second synchronization source, and ensure normal data transmission.

The data transmission apparatus in this embodiment of the present invention may be applied to specific steps and an execution procedure of the eNB in the data transmission method of the embodiments of the present invention, and units/modules of the apparatus and other operations and/or functions described above are respectively for implementing corresponding procedures of the eNB in the method shown in FIG. 3. Details are not described herein again for brevity.

In an optional embodiment, the receiving unit may be a receiver and the sending unit may be a transmitter. The receiver and the transmitter may be configured to respectively perform methods performed by the receiving unit and the sending unit. Details are not described again to avoid repetition.

Figure 6:
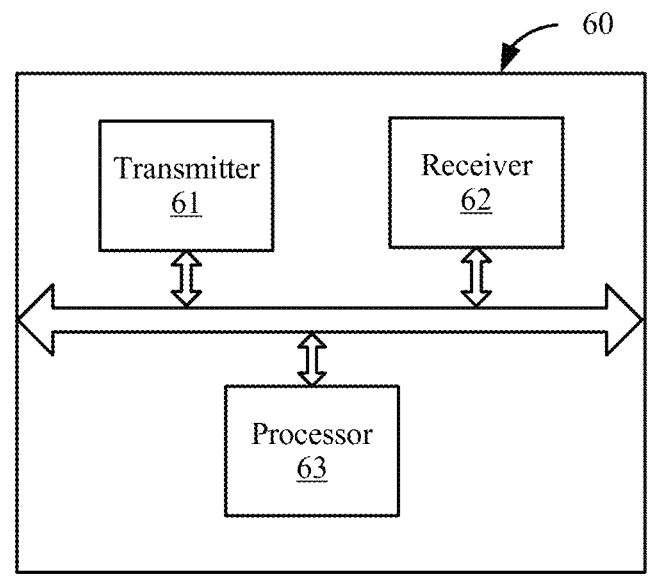
FIG. 6 is a block diagram of a data transmission apparatus according to an embodiment of the present invention.

FIG. 6 is a block diagram of a data transmission apparatus according to another embodiment of the present invention. An apparatus 60 in FIG. 6 includes a transmitter 61, a receiver 62, and a processor 63. The processor 63 controls an operation of the apparatus 60 and may be configured to process a signal.

The method disclosed in the foregoing embodiments of the present invention may be applied to the processor 63, or may be implemented by the processor 63. In an implementation process, steps in the foregoing method may be completed by using an integrated logic circuit of hardware or an instruction in a form of software in the processor 63. The processor 63 may be a general-purpose processor, a digital signal processor, an application-specific integrated circuit, a field programmable gate array or another programmable logic device, a discrete gate or a transistor logic device, or a discrete hardware component, and may implement or perform methods, steps, and logic block diagrams that are disclosed in the embodiments of the present invention. The general-purpose processor may be a microprocessor, any conventional processor, or the like. The steps of the methods disclosed with reference to the embodiments of the present invention may be directly implemented by using a hardware processor, or may be implemented by using a combination of hardware and a software module in the processor.

Specifically, the receiver 62 may receive first synchronization source configuration information on a first carrier. The first synchronization source configuration information is used to determine a first synchronization source.

The processor 63 may determine the first synchronization source based on the first synchronization source configuration information; determine that synchronization with the first synchronization source fails; and determine a second synchronization source and a transmission resource. The first synchronization source is used to provide UE with a synchronization clock required for transmitting data on a second carrier. A frequency of the first carrier is different from a frequency of the second carrier.

The transmitter 61 may transmit the data on the second carrier by using the transmission resource and based on the second synchronization source.

In this embodiment of the present invention, user equipment determines, based on synchronization source information configured by a base station, a synchronization source required for transmitting data. After being out of synchronization with the synchronization source, the UE re-determines a new synchronization source, and uses the new synchronization source for data transmission. In this way, when frequencies of a transmission carrier and a service carrier are different, normal data transmission can still be implemented after the UE is out of synchronization with an original synchronization source.

The data transmission apparatus in this embodiment of the present invention may be applied to specific steps and an execution procedure of the UE in the data transmission method of the embodiments of the present invention, and units/modules of the apparatus and other operations and/or functions described above are respectively for implementing corresponding procedures of the UE in the method shown in FIG. 2. Details are not described herein again for brevity.

Figure 7:
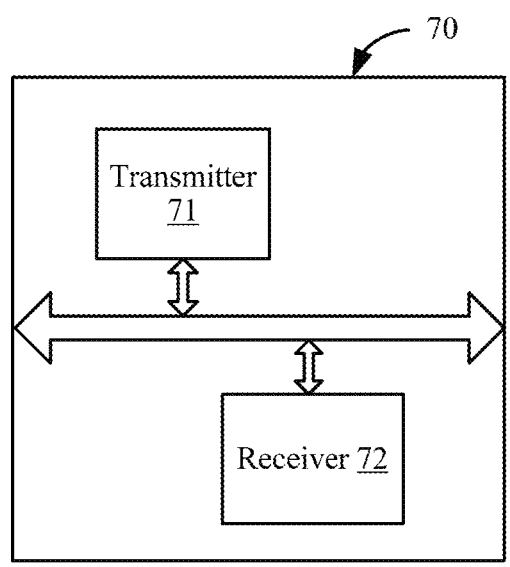
FIG. 7 is a block diagram of a data transmission apparatus according to another embodiment of the present invention.

FIG. 7 is a block diagram of a data transmission apparatus according to another embodiment of the present invention. An apparatus 70 in FIG. 7 includes a transmitter 71 and a receiver 72.

Specifically, the transmitter 71 may send first synchronization source configuration information to user equipment UE by using a first carrier, where the first synchronization source configuration information carries an identifier of a first synchronization source, and the first synchronization source configuration information is used to determine the first synchronization source.

The receiver 72 may receive indication information sent by the UE. The indication information is used to indicate that synchronization between the UE and the first synchronization source fails. The first synchronization source is used to provide the UE with a synchronization clock required for transmitting data on a second carrier. A frequency of the first carrier is different from a frequency of the second carrier.

The access network device in this embodiment of the present invention configures a synchronization source for the UE, and after synchronization between the UE and the synchronization source fails, receives indication information that is sent by the UE and that indicates that the synchronization with the synchronization source fails. In this way, after the synchronization between the UE and the synchronization source fails, based on the indication information, the access network device may skip sending signaling to the UE or configuring a resource corresponding to the first synchronization source for the UE, so as to save a signaling overhead.

In an optional embodiment, the transmitter 71 may further be configured to send second synchronization source configuration information to the UE on the first carrier. The second synchronization source configuration information is used by the UE to determine a second synchronization source based on the second synchronization source configuration information after the synchronization with the first synchronization source fails, and transmit the data on the second carrier based on the second synchronization source.

The data transmission apparatus in this embodiment of the present invention may be applied to specific steps and an execution procedure of the eNB in the data transmission method of the embodiments of the present invention, and units/modules of the apparatus and other operations and/or functions described above are respectively for implementing corresponding procedures of the eNB in the method shown in FIG. 3. Details are not described herein again for brevity.

It should be understood that "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that in the embodiments of the present invention, "B corresponding to A" indicates that B is associated with A, and B may be determined based on A. However, it should further be understood that determining A based on B does not mean that B is determined based on A only; in other words, B may be determined based on A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
receiving, by user equipment (UE), first synchronization source configuration information on a first carrier, wherein the first synchronization source configuration information carries an identifier of a first synchronization source, the first synchronization source configuration information is used to determine the first synchronization source;
determining, by the UE, the first synchronization source based on the first synchronization source configuration information, wherein the first synchronization source is used to provide the UE with a synchronization clock required for transmitting data on a second carrier, and wherein a frequency of the first carrier is different from a frequency of the second carrier;
determining, by the UE, that synchronization with the first synchronization source fails;
determining, by the UE, a second synchronization source and a transmission resource, wherein the transmission resource is associated with the second synchronization source, wherein a priority of the second synchronization source is equal to or less than a priority of the first synchronization source, wherein the determining, by the UE, a second synchronization source and a transmission resource comprises:
obtaining, by the UE, resource pool configuration information, wherein the resource pool configuration information is obtained based on signaling configuration information received on the first carrier;
transmitting, by the UE, the data on the second carrier using the transmission resource and based on the second synchronization source; and
sending, by the UE on the first carrier, identification information of the second synchronization source to an access network device, wherein the identification information of the second synchronization source indicates a current synchronization source of the UE.

2. The method according to claim 1, wherein the determining, by the UE, that synchronization with the first synchronization source fails comprises any one of the following manners:
if the UE does not receive a synchronization signal from the first synchronization source when a synchronization timer of the UE exceeds a specified time, determining, by the UE, that the synchronization with the first synchronization source fails;
if strength of a synchronization signal received by the UE from the first synchronization source is less than a first preset threshold, determining, by the UE, that the synchronization with the first synchronization source fails; or
if average strength of synchronization signals received by the UE from the first synchronization source in specified duration T is less than a second preset threshold, determining, by the UE, that the synchronization with the first synchronization source fails.

3. The method according to claim 1, wherein the determining, by the UE, that synchronization with the first synchronization source fails comprises:
if the UE detects the second synchronization source, signal strength of the second synchronization source is greater than a third preset threshold, and a priority of the second synchronization source is higher than a priority of the first synchronization source, determining, by the UE, that the synchronization with the first synchronization source fails.

4. The method according to claim 1, wherein the determining, by the UE, a second synchronization source and a transmission resource comprises:
determining, by the UE, a transmission resource pool based on the resource pool configuration information; and
determining, by the UE, the transmission resource based on the transmission resource pool.

5. The method according to claim 1, wherein the first synchronization source is a global navigation satellite system (GNSS).

6. The method according to claim 1, wherein the transmitting, by the UE, the data on the second carrier using the transmission resource and based on the second synchronization source comprises:
transmitting, by the UE, the data in a direct connection communication manner on the second carrier based on the second synchronization source.

7. The method according to claim 1, wherein the data is vehicle-to-everything (V2X) communication data.

8. The method according to claim 1, wherein the signaling configuration information comprises radio resource control (RRC) dedicated signaling.

9. An apparatus, comprising at least one processor, and a non-transitory computer-readable storage medium coupled to the at least one processor and storing programming instructions for execution by the at least one processor, wherein the programming instructions instruct the at least one processor to:
receive first synchronization source configuration information on a first carrier, wherein the first synchronization source configuration information carries an identifier of a first synchronization source, the first synchronization source configuration information is used to determine the first synchronization source;
determine the first synchronization source based on the first synchronization source configuration information, wherein the first synchronization source is used to provide a synchronization clock required for transmitting data on a second carrier, and wherein a frequency of the first carrier is different from a frequency of the second carrier, wherein
determine that synchronization with the first synchronization source fails,
determine a second synchronization source and a transmission resource, wherein the transmission resource is associated with the second synchronization source, wherein a priority of the second synchronization source is equal to or less than a priority of the first synchronization source, wherein the second synchronization source and the transmission resource are determined based on resource pool configuration information that is obtained based on signaling configuration information received on the first carrier;
transmit the data on the second carrier using the transmission resource and based on the second synchronization source; and
send identification information of the second synchronization source to an access network device, wherein the identification information of the second synchronization source indicates a current synchronization source of the apparatus.

10. The apparatus according to claim 9, wherein the programming instructions instruct the at least one processor to determine, in any one of the following manners, that the synchronization with the first synchronization source fails:

if a synchronization signal from the first synchronization source is not received before a synchronization timer exceeds a specified time, determining that the synchronization with the first synchronization source fails;

if strength of a synchronization signal from the first synchronization source is less than a first preset threshold, determining that the synchronization with the first synchronization source fails; and if average strength of synchronization signals received from the first synchronization source in specified duration T is less than a second preset threshold, determining that the synchronization with the first synchronization source fails.

11. The apparatus according to claim 9, wherein the programming instructions instruct the at least one processor to: if the second synchronization source is detected, signal strength of the second synchronization source is greater than a third preset threshold, and a priority of the second synchronization source is higher than a priority of the first synchronization source, determine that the synchronization with the first synchronization source fails.

12. The apparatus according to claim 9, wherein the programming instructions instruct the at least one processor to: determine a transmission resource pool based on the resource pool configuration information; and determine the transmission resource based on the transmission resource pool.

13. The apparatus according to claim 9, wherein the first synchronization source is a global navigation satellite system (GNSS).

14. The apparatus according to claim 9, wherein the programming instructions instruct the at least one processor to transmit data in a direct connection communication manner on the second carrier based on the second synchronization source.

15. The apparatus according to claim 9, wherein the data is vehicle-to-everything (V2X) communication data.

16. The apparatus according to claim 9, wherein the signaling configuration information comprises radio resource control (RRC) dedicated signaling.

* * * * *